UNITED STATES PATENT OFFICE.

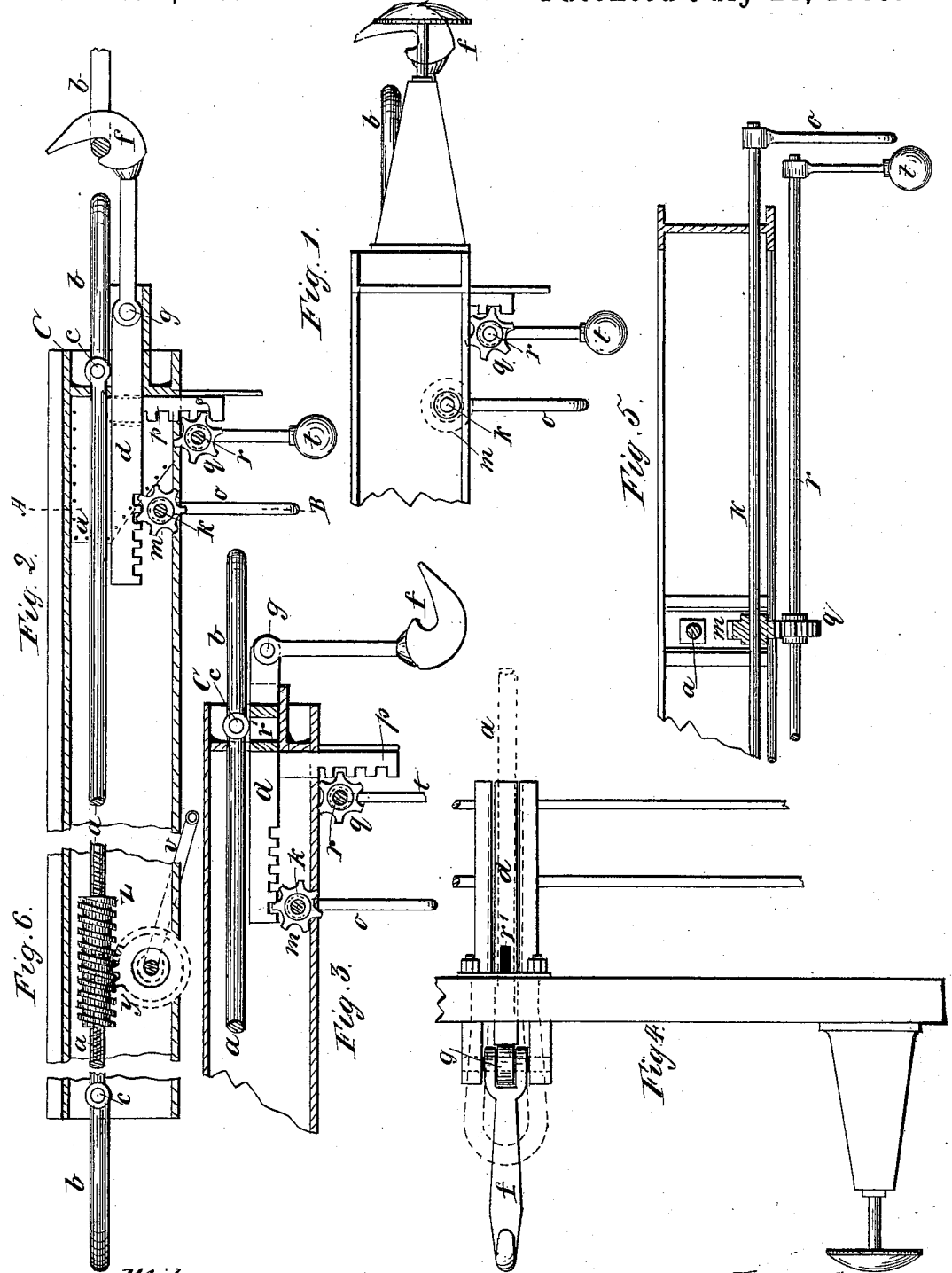

CARL LUDWIG SCHULZE, OF BERLIN, GERMANY.

CAR-COUPLING.

SPECIFICATION forming part of Letters Patent No. 322,979, dated July 28, 1885.

Application filed January 21, 1885. (No model.)

*To all whom it may concern:*

Be it known that I, CARL LUDWIG SCHULZE, of the city of Berlin, Kingdom of Prussia, German Empire, have invented new and useful Improvements in Railway-Couplings, of which the following is a specification.

The hereinafter-described railway-coupling permits the coupling and uncoupling of the vehicles from the sides without requiring the workman to pass between the carriages. It differs from the constructions hitherto known for the same purpose by its greater simplicity. This invention is represented in the accompanying drawings, in which—

Figure 1 is a side elevation. Fig. 2 is a longitudinal section showing the position of parts when two vehicles are coupled. Fig. 3 is a longitudinal section when the coupling is released; Fig. 4, plan of Fig. 1; Fig. 5, transverse section on A B, Fig. 2; Fig. 6, details of the tightening device.

$a$ is the ordinary draw-bar going through the entire carriage, and instead of carrying the coupling-hook carries the coupling-link $b$, attached thereto by a ball, $c$, so as to remain movable in a vertical plane, Figs. 2, 3, 6.

In the buffer-beam C there is mounted directly beneath the draw-bar $a$ a rack, $d$, to which the hook $f$ is firmly attached. The hook $f$ also is fastened upon the rack $d$ by a bolt, $g$, allowing it to rotate, as seen in Fig. 3. The toothed bar or rack $d$ is mounted in the buffer-beam C, as stated, and held in a guide, $i$, in such a manner that the hook $f$, when the rack is drawn back, is forced to assume a horizontal position, Fig. 2, and therefore engages with the coupling-link on the next vehicle; but when the rack is pushed outward, the draw-hook $f$ automatically falls out of the link $b$ and assumes the position shown in Fig. 3, and the coupling is thereby released. The form of the coupling-hook is correspondingly determined in such a manner that it falls down when the rack $d$ is pushed outward, the hook having such a curvature that the inner or engaging surface of the same is a segment of a circle struck from its center of rotation or from the bolt $g$.

The backward and forward sliding motion of the rack $d$ in the guide $i$, provided in the buffer-beam C, is effected by a toothed wheel, $m$, fixed on the axle $k$ in such a manner that the wheel $m$ and axle $k$ can be rotated from the side of the vehicle by means of the hand-lever $o$.

Now, to retain the draw-bar in position when the cars are coupled, a latch or bar, $p$, is provided on the buffer-beam C. The said latch moves vertically and fits into a recess, $r'$, Fig. 3, of the rack $d$, the lower end of the latch being toothed. (See Fig. 2.) This latch is moved up and down by a toothed wheel, $q$, fixed on a shaft, $r$, which is carried by the longitudinal framing of the vehicle. On the said shaft $r$ a counter-weighted lever, $t$, is fixed so that the rack $d$ will be firmly held by the latch $p$ when the draw-hook $f$ is in a horizontal position, as shown in Fig. 2, so that the vehicles are coupled.

To effect the uncoupling from the side of the vehicle, the counter-weight lever $t$ is first rotated through an arc of ninety degrees, so that the latch $p$ releases the rack $d$. By next turning the lever $o$ the rack $d$ is pushed forward. The guide $i$ then no longer supports the draw-hook $f$, and the latter, by its own weight, falls down. (Position shown in Fig. 3.)

To tighten this coupling up, the draw-bar $a$, to which the coupling-links $b$ are attached, is divided, (see Fig. 6,) and the two parts united by an internally-threaded sleeve, $z$, the ends of the parts of the draw-bar being correspondingly threaded. To this end it will be convenient to use a right-handed thread for one part of the rod $a$ and a left-handed thread for the other part, so that when the sleeve is turned the length of the draw-bar is rapidly diminished and the coupling is tightened.

As shown in the drawings, Fig. 6, the sleeve $z$ can be screw-threaded at the outside also, and a worm-wheel, $y$, gears therewith, and is turned from the side of the vehicle by means of a lever or crank, $v$, so that the sleeve $z$ also turns. Lastly, a worm-wheel may be fixed on the sleeve $z$ and the screw be formed on the spindle, which is turned by the crank $v$.

I claim—

1. In a car-coupling, the combination of a longitudinally-movable coupling-hook operating to rise and fall when moved in or out of its guide, as described, with a continuous draw-bar constructed of two sections and carrying coupling-links at each end, the coupling-sleeve z, and mechanism for rotating said sleeve to adjust the draw-bar, substantially as described, for the purpose specified.

2. In a coupling for railway-vehicles, the hook f, attached to a rack or toothed bar, d, both working in a suitable guide, i, in the buffer-beam C, the rack d being operated by the toothed wheel m, connected with the lever o, substantially as and for the purpose set forth.

3. In a coupling for railway-vehicles, the latch p, gearing with the toothed wheel q, operated by the counter-weighted lever t, and serving to fix the coupling-hook f in position, substantially as set forth.

4. A coupling for railway-vehicles, in which the coupling-hook on one vehicle is caused to rise or fall by means of a toothed bar or rack, d, operating in combination with the guide i or equivalent, so that the hook may engage with the link of the vehicle or release the same, substantially as and for the purpose set forth, and shown in the drawings.

CARL LUDWIG SCHULZE.

Witnesses:
ALEX SCHULZE,
B. ROI.